United States Patent [19]

Spanjer

[11] 3,734,382

[45] May 22, 1973

[54] APPARATUS FOR CONTROL OF WELDING APPARATUS
[75] Inventor: Keith G. Spanjer, Scottsdale, Ariz.
[73] Assignee: Motorola, Inc., Franklin Park, Ill.
[22] Filed: Apr. 3, 1972
[21] Appl. No.: 240,442

[52] U.S. Cl. .......................................... 228/1, 228/8
[51] Int. Cl. .............................................. B23k 5/20
[58] Field of Search .......................... 228/1, 8, 9; 29/470.1

[56] References Cited
UNITED STATES PATENTS
3,212,695  10/1965  MacGregor ............................. 228/1

Primary Examiner—J. Spencer Overholser
Assistant Examiner—Richard Bernard Lazarus
Attorney—Vincent J. Rauner and Henry T. Olsen

[57] ABSTRACT

A system for improving the quality of a bond obtained from an ultrasonic welding apparatus includes a resistance measuring circuit for monitoring the electrical resistance between the wire to be bonded and the bonding head. The welding apparatus is automatically de-activated upon an increase in said resistance, the increase being indicative of bond formation. De-activating the bonding apparatus immediately following bond formation prevents the application of further ultrasonic energy from weakening the bond.

2 Claims, 1 Drawing Figure

Patented May 22, 1973  3,734,382
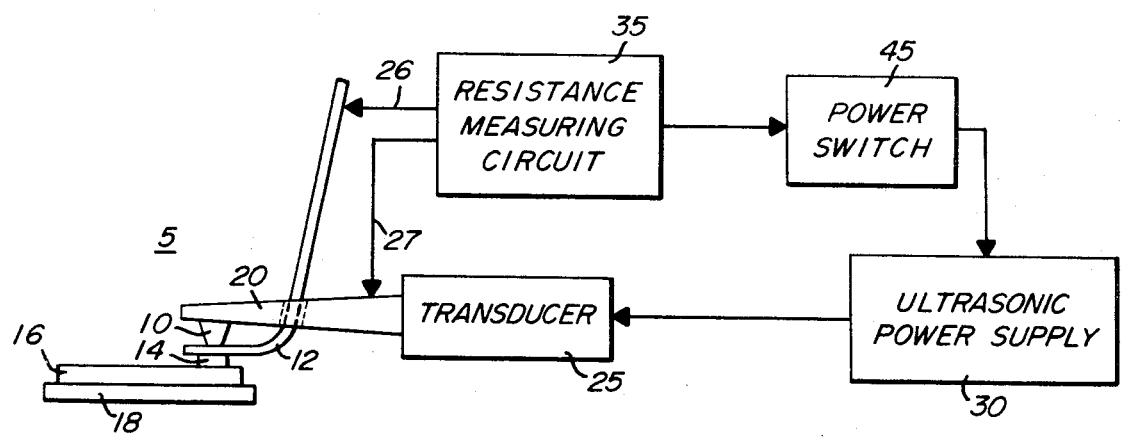

APPARATUS FOR CONTROL OF WELDING APPARATUS

BACKGROUND

1. Field of Invention

This invention relates generally to welding methods and apparatus, and more particularly to ultrasonic welding techniques employed in semiconductor manufacture and the like.

There are many applications wherein it is necessary to provide a welded connection to a small component. One such application is in the manufacture of semiconductor devices where it is necessary to weld a very small diameter wire to a bonding pad on the device.

2. Prior Art

Several techniques for providing suitable electrical and mechanical connections between a semiconductor device and a small diameter wire are known. Such systems generally utilize ultrasonic welding techniques wherein a wire, generally of gold or aluminum, is welded to a bonding pad, also of gold or aluminum by bringing the wire and bonding pad into intimate contact under pressure and moving the wire with respect to the bonding pad for a predetermined time duration at an ultrasonic rate until sufficient heat is generated to weld the wire to the bonding pad. The ultrasonic energy is applied to the wire for a predetermined time duration, the time being adjusted in accordance with the diameter of the wire used and the amount of pressure applied, the time being adjusted so that a bond is formed under average conditions.

Other such systems employ the aforementioned bonding techniques in conjunction with apparatus for sensing the formation of the bond which measures the resistance between the wire and a portion of the semiconductor device. A drop in the resistance between the wire and the device, indicative of bond formation, is detected, and the welding cycle is terminated immediately following said drop to prevent further energy from weakening the bond.

Whereas these techniques provide a way to achieve a connection between a semiconductor device and its package, the time required for the bond to form is not readily predictable due to variations in surface properties, therefore, the first technique requires that the ultrasonic transducer be operated for a relatively long period of time to assure that bonding occurs. However, in cases where the bond occurs rapidly, the continued application of ultrasonic energy deforms the wire and weakens the bond, thereby reducing the reliability of the device. The second technique provides a way to reduce the bond weakening problems associated with the first technique, however, the accuracy of the prior art technique in detecting bond formation is limited due to variations in the resistance between the wire and the device caused by variations in devices and by variations in device parameters caused by heating of the device during the welding process.

SUMMARY

It is an object of the present invention to provide an improved welding apparatus that provides consistently good quality bonds between a wire and another miniature component, regardless of the physical nature of the component.

It is a further object of this invention to provide a method of welding miniature components which provide an optimum bond regardless of the nature of the materials employed.

It is another object of this invention to provide a control apparatus for automatically controlling a welding apparatus to assure optimum bond formation.

In accordance with a preferred embodiment of the invention, a bonding head is used to apply ultrasonic welding energy to a wire or other workpiece. The electrical resistance between the bonding head and the wire is monitored, and the ultrasonic power to the head is turned off when a rise in the electrical resistance between the wire and the head, indicative of bond formation, occurs.

DESCRIPTION OF THE DRAWING

The single FIGURE shows, in block diagram form, a system for improving the quality of ultrasonic welds according to the invention.

DETAILED DESCRIPTION

Referring to the FIGURE, which shows a diagram of a preferred embodiment of the invention, a bonding head 5 comprising a wedge 10 and a horn 20 applies pressure and ultrasonic energy to a workpiece, in this embodiment, a wire 12, which is to be bonded to a second workpiece, in this embodiment, a semiconductor bonding pad 14, which is attached to a semiconductor chip 16. A support structure 18 is used to support chip 16 and bonding pad 14 during the welding operation. The aforementioned structure is of conventional design and does not form part of the invention.

Wedge 10 is driven by an ultrasonic transducer 25 which receives electrical energy from a power supply 30 and applies acoustic energy to wedge 10 through horn 20 or other suitable acoustic energy transfer means.

An automatic shut-off system, according to the invention, comprises resistance measuring means, in this embodiment, a resistance measuring circuit 35, and switch means, in this embodiment, a power switch 45. Resistance measuring circuit 35 is connected to horn 20 and wire 12 via leads 26 and 27 for measuring the resistance between the bonding head 5 and wire 12. Power switch 45 is connected to resistance measuring circuit 35 and the ultrasonic power supply 30 and shuts off or otherwise de-activates power supply 30 when the resistance measured by circuit 35 exceeds a predetermined value.

In operation, as the welding cycle is commenced, power in the form of an alternating current voltage having a frequency of 50 to 60 KHz is applied to transducer 25 by the ultrasonic power supply 30. Transducer 25 produces acoustic energy which is transferred to wedge 10 by horn 20. The acoustic energy causes wedge 10 to vibrate at an ultrasonic rate and to move wire 12 with respect to pad 14 along the surface of pad 14 at the ultrasonic rate. As the wire 12 is moved relative to pad 14, the heat generated by sheer stress and friction causes wire 12 to become plastic and to eventually adhere to pad 14. After the bond is made, wire 12 becomes firmly attached to pad 14 and no longer moves in unison with wedge 10. The relative motion between wedge 10 and wire 12 causes the electrical resistance between wedge 10 and wire 14 to increase. This increase occurs immediately upon formation of the ultrasonic bond and is used to terminate the welding cycle according to the invention.

Resistance measuring circuit 35, which may include a bridge or other resistance sensing apparatus, monitors the resistance between wire 12 and head 5 and provides a signal to power switch 45 for de-activating power supply 30 when the electrical resistance between head 5 and wire 10 increases. The resistance increase, which is indicative of bond formation, terminates the welding cycle when an optimum bond is obtained.

Prior art systems, which attempted to accurately control the time duration of the welding cycle to prevent the aforementioned bond weakening problems, have included means for measuring the resistance or other electrical characteristics between the wire 12 and pad 14 or another area of chip 16. These systems attempt to sense the decrease in resistance between pad 14 and wire 12 which occurs when a bond is formed.

Although the prior art system provide some indication of bond formation, the heat generated during the welding process changes the electrical characteristics of chip 16 and bonding pad 14 sufficiently to obscure the resistance change caused by the bond formation. Other prior art systems monitor the changes in electrical characteristics of chip 16 to provide an indication of bond formation, but changes in electrical characteristics resulting from the heating of the chip do not provide as accurate an indication of bond formation as do the techniques of the present invention.

The techniques of the instant invention provide a means for accurately determining when an ultrasonic bond is formed by detecting a change in the resistance between the workpiece and the bonding head. The increase in resistance occurs as a result of increased relative motion between the workpiece and the bonding head when the workpiece becomes permanently bonded and no longer moves with the bonding head. Monitoring the resistance between the bonding head and the wire eliminates inaccuracies caused by the heating of the semiconductor chip. This allows the ultrasonic welding apparatus to be turned off immediately following bond formation, thereby preventing weakening of the bond by subsequent application of acoustic energy, and provides more reliable ultrasonic bonds than could be heretofore achieved.

I claim:

1. In a bonding apparatus having an ultrasonic transducer and a bonding head energized by said transducer for moving a first workpiece relative to another under pressure at an ultrasonic rate, a system for detecting the formation of a bond comprising, means coupled to said bonding head and said first workpiece for measuring the electrical resistance between said bonding head and said first workpiece and for detecting a change therein, said change being indicative of the formation of said bond, and switch means connected to said measuring means and responsive thereto for de-energizing said head following a change in electrical resistance between said head and said first workpiece.

2. A system as recited in claim 1 wherein said measuring means includes apparatus for operating said switch means to de-energize said head following an increase in electrical resistance between said head and said first workpiece.

* * * * *